(12) United States Patent
Chandrashekar et al.

(10) Patent No.: US 12,114,038 B2
(45) Date of Patent: Oct. 8, 2024

(54) METHODS AND SYSTEMS FOR PROVIDING DYNAMIC CONTENT BASED ON USER PREFERENCES

(71) Applicant: Rovi Guides, Inc., San Jose, CA (US)

(72) Inventors: Padmassri Chandrashekar, Karnataka (IN); Daina Emmanuel, Bangalore (IN); Jayshil Parekh, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/221,272

(22) Filed: Apr. 2, 2021

(65) Prior Publication Data

US 2022/0321951 A1    Oct. 6, 2022

(51) Int. Cl.
| | |
|---|---|
| *H04N 21/44* | (2011.01) |
| *H04N 21/442* | (2011.01) |
| *H04N 21/45* | (2011.01) |
| *H04N 21/488* | (2011.01) |

(52) U.S. Cl.
CPC .  *H04N 21/44016* (2013.01); *H04N 21/44218* (2013.01); *H04N 21/4532* (2013.01); *H04N 21/4884* (2013.01)

(58) Field of Classification Search
CPC ....... H04N 21/44016; H04N 21/44218; H04N 21/4532; H04N 21/4884
See application file for complete search history.

(56) References Cited

U.S. PATENT DOCUMENTS

| | | | | |
|---|---|---|---|---|
| 8,041,190 | B2* | 10/2011 | Candelore | G11B 27/034 |
| | | | | 386/287 |
| 8,176,518 | B1* | 5/2012 | Junkin | A63F 13/46 |
| | | | | 725/9 |
| 8,640,181 | B1* | 1/2014 | Inzerillo | H04N 21/242 |
| | | | | 725/151 |
| 9,794,638 | B2* | 10/2017 | Jo | H04N 21/4884 |
| 10,489,496 | B1* | 11/2019 | Sen | H04N 21/4882 |
| 11,450,351 | B1* | 9/2022 | El Ghazzal | G11B 27/031 |
| 2003/0005437 | A1* | 1/2003 | Feuer | H04N 21/4532 |
| | | | | 725/34 |
| 2003/0167467 | A1* | 9/2003 | Allen | H04N 21/4314 |
| | | | | 725/47 |
| 2003/0208755 | A1* | 11/2003 | Zimmerman | H04N 21/4668 |
| | | | | 725/35 |
| 2004/0003402 | A1* | 1/2004 | McKenna, Jr. | H04N 21/4438 |
| | | | | 725/46 |

(Continued)

*Primary Examiner* — Timothy R Newlin
(74) *Attorney, Agent, or Firm* — HALEY GUILIANO LLP

(57) ABSTRACT

Systems and methods are presented for providing of dynamic content based on user preferences, for example, identifying a consumer's preferences for a media asset and tailoring the media asset to the consumer's preferences to encourage the consumer to continue to consume the media asset. The system generates the media asset for consumption. The system identifies a media asset consumption profile based on the media asset and a viewer profile and identifies a second media asset that may be used to enhance to the first media asset. The system generates an enhanced media asset from the second media asset based on the viewer profile and provides the enhanced program for consumption. An enhanced media asset may include the video content of the first media asset and the audio and text content from the second media asset.

20 Claims, 7 Drawing Sheets

(56) References Cited

U.S. PATENT DOCUMENTS

| | | | |
|---|---|---|---|
| 2004/0250272 A1* | 12/2004 | Durden | H04N 21/2543 725/25 |
| 2006/0291813 A1* | 12/2006 | Ando | G11B 27/34 386/244 |
| 2007/0147798 A1* | 6/2007 | Chang | G09B 19/06 386/E9.04 |
| 2007/0252913 A1* | 11/2007 | Minobe | H04N 21/47 725/38 |
| 2008/0235087 A1* | 9/2008 | Amento | G06Q 30/0276 705/14.54 |
| 2009/0100361 A1* | 4/2009 | Abello | H04N 21/4782 715/764 |
| 2009/0172746 A1* | 7/2009 | Aldrey | H04N 21/4351 725/61 |
| 2010/0225808 A1* | 9/2010 | Mears | H04N 21/47 348/E7.001 |
| 2011/0034242 A1* | 2/2011 | Aronzon | A63F 13/75 463/29 |
| 2011/0135283 A1* | 6/2011 | Poniatowki | H04N 21/47217 386/297 |
| 2012/0105719 A1* | 5/2012 | Fratti | H04N 21/8106 348/462 |
| 2012/0200773 A1* | 8/2012 | Davis | H04N 21/4852 348/E9.034 |
| 2013/0095924 A1* | 4/2013 | Geisner | A63F 13/21 463/32 |
| 2014/0040931 A1* | 2/2014 | Gates, III | H04N 21/4751 725/14 |
| 2015/0128174 A1* | 5/2015 | Rango | H04N 21/4532 725/34 |
| 2016/0205428 A1* | 7/2016 | McDonough | H04N 21/2541 725/31 |
| 2016/0269797 A1* | 9/2016 | Li | H04N 21/4884 |
| 2016/0309214 A1* | 10/2016 | Chung | H04N 21/4126 |
| 2016/0345062 A1* | 11/2016 | Klappert | H04L 67/306 |
| 2016/0364397 A1* | 12/2016 | Lindner | H04L 65/604 |
| 2017/0188106 A1* | 6/2017 | Harb | H04N 21/44029 |
| 2017/0264920 A1* | 9/2017 | Mickelsen | G06V 40/174 |
| 2017/0374402 A1* | 12/2017 | Pogorelik | H04N 21/84 |
| 2017/0374423 A1* | 12/2017 | Anderson | H04N 21/4325 |
| 2018/0192137 A1* | 7/2018 | Patel | H04N 21/237 |
| 2018/0261255 A1* | 9/2018 | Goshen | H04N 9/8211 |
| 2020/0007902 A1* | 1/2020 | Li | H04N 21/435 |
| 2020/0007946 A1* | 1/2020 | Olkha | H04N 21/25891 |
| 2020/0186851 A1* | 6/2020 | Kahn | H04N 21/26241 |
| 2020/0265962 A1* | 8/2020 | Al Refae | G16Y 20/40 |
| 2020/0275158 A1* | 8/2020 | Gaur | H04N 21/26603 |
| 2020/0296463 A1* | 9/2020 | Martinez | H04N 21/4524 |
| 2020/0304882 A1* | 9/2020 | Dos Santos | H04N 21/4532 |
| 2021/0168460 A1* | 6/2021 | Lee | G06F 40/157 |
| 2021/0266473 A1* | 8/2021 | Engelke | G06F 40/284 |
| 2021/0266641 A1* | 8/2021 | Selfors | G06K 9/72 |
| 2021/0352369 A1* | 11/2021 | Savage | H04N 21/4532 |
| 2022/0198158 A1* | 6/2022 | Tai | G06F 40/53 |

\* cited by examiner

| Event Type | Event Tags | Profile |
|---|---|---|
| Baseball 302A | #NumberofEventsWatched #SupportedTeams #HoursWatched | #Fun #Beginner #Intermediate=TRUE #Advanced |
| Cricket 302B | #NumberofEventsWatched #SupportedTeams #HoursWatched | #Fun #Beginner=TRUE #Intermediate #Advanced #Cynical #Sattire |
| Political News 302C | #MostViewedAnchor #Right #Left #HoursWatched | #Right #Left #Cynical #Sattire #Comedy=TRUE |

302 — Event Type
304 — Event Tags
306 — Profile
300

FIG. 3

| Event Type | Action | Profile |
|---|---|---|
| Audio Book 602A | #Walking | #EnhanceModulation = False<br>#RepeatCritical=True<br>#EnableVolumeControl=True |
| Audio Book 602B | #Driving | #EnhanceModulation = True<br>#RepeatCritical=True<br>#EnableVolumeControl=True |
| Audio Book 602C | #FocussedWatchingMobile | #EnhanceModulation = False<br>#RepeatCritical=False<br>#EnableVolumeControl=True |
| Video 602D | #OntheMove | #EnhanceModulation = False<br>#RepeatCritical=False<br>#EnableDynamicAudio=True<br>#EnableDynamicSubtitle=False |
| Video 602E | #FocussedWatching10ft | #EnhanceModulation = False<br>#RepeatCritical=False<br>#EnableDynamicAudio=True<br>#EnableDynamicSubtitle=True |
| Video 602F | #FocussedWatchingMobile | #EnhanceModulation = False<br>#RepeatCritical=False<br>#EnableDynamicAudio=True<br>#EnableDynamicSubtitle=True |

FIG. 6

METHODS AND SYSTEMS FOR PROVIDING DYNAMIC CONTENT BASED ON USER PREFERENCES

BACKGROUND

The present disclosure relates to systems for providing content and, more particularly, to systems and related processes for providing dynamic content based on a user's experience with the content.

SUMMARY

Each consumer has varying consumption preferences while consuming content. For example, as some consumers prefer to watch the content with a fun twist, e.g., gossip news on the players and team; other consumers prefer to watch the content with technical background, e.g., statistic, rules, and explanations; while other consumers prefer to watch the content by learning the sport, e.g., rules and strategies. To accomplish this, consumers have to switch back and forth between multiple sources of content or employ multiple devices, with one device providing the video and another device providing additional content (e.g., audio, subtitles, statistics, gossip, rules, etc.). Generally, the content, such as video, animation, playlists, games, and other media, is presented with video, audio and supplemental content (e.g., subtitles) with no way to customize the presentation, thereby limiting the consumer's experience.

Further complicating the consumer experience is the consumer's active lifestyle while multitasking. Consumers multitask while consuming content, which makes it difficult to focus on the content. For example, some consumers consume (e.g., listen, watch) content while walking, running, traveling on a bus or train, driving, cooking, or any other activity causing the consumer to perform one or more tasks while consuming the content. To avoid missing any content, consumers have to pause and rewind parts of the content and constantly adjust the device's presentation (e.g., volume, modulation, etc.). These approaches are deficient because they may lead to the consumer missing parts of the original content while decreasing the consumer's enjoyment of the content.

Devices facilitate delivery of content for consumption at any time and nearly in any place, which may decrease tolerance for content falling outside of a consumer's usual preferences. The ability of devices to provide content to a content consumer is often enhanced with advanced hardware with increased memory and fast processors in devices. Devices, such as computers, telephones, smartphones, tablets, smartwatches, speakers/microphones (e.g., with a virtual assistant), activity trackers, e-readers, voice-controlled devices, servers, televisions, digital content systems, video game consoles, and other internet-enabled appliances can provide and deliver content almost instantly.

Content delivery systems may use, for example, interactive content guidance applications to recommend content and facilitate content selection. Typically, consumer preferences are associated with a profile or an account, such as a consumer profile, user profile, user account, subscriber profile, or subscriber account. As used herein, the term "consumer" may be an individual or may be used as an equivalent of a user account, subscriber account, viewer account or other accounts with content provider systems and/or services. The term "consumer" may be used interchangeably with "user" and "viewer." Preferences may be stored as part of a user profile and may be referred to as a consumer profile. A consumer profile may be stored in the cloud (e.g., a remote-secure server) and accessed by interactive content guidance applications initiated by a viewer (e.g., by logging in).

The present disclosure describes systems and methods that replace audio and textual content of a media asset with audio and textual content from a corresponding media content item based on the user profile. The systems generate for consumption a first media asset on a user device, the first media asset including first metadata, first subtitles and first audio. For example, a system may generate a soccer match for consumption including subtitles associated with audio and textual data (e.g., statistics). The system then identifies, based on a mapping logic configured on consumer habits (e.g., hours watched, type of content watched, etc.) and the metadata associated with the first media asset, a media asset consumption profile associated with the user device. For example, the system identifies, based on the user consuming a soccer match and on the consumer's profile (i.e., based on a number of events watched, supported teams and hours watched) the type of media asset consumption profile (e.g., an intermediate consumer). The system then searches for one or more second media assets corresponding to the media asset consumption profile (e.g., intermediate consumer) and the first media asset. For example, the system searches for second content (e.g., different commentators, statistics, game rules, etc.) that is associated with the first content (soccer match). The second content includes one or more audio and textual media assets that are preferred by the consumer who is identified as an intermediate consumer. For example, the system searches and identifies entities or other information that may be relevant or of interest (based on the consumer being an intermediate consumer) to consumer and generates an annotation with that information. The annotation may have the same form as the subtitles of the first media content item for consistency and is linked to the media content. The system may search and identify more than one annotation and then select from among those annotations to provide the most relevant annotation to the user based on the media asset consumption profile. The system then generates the first media asset for output with the replaced one or more annotations, including one or more second subtitles and second audio. The system then replaces one or more of the first subtitles and the first audio from the first media asset with one or more annotations, second subtitles and second audio from the second media asset. For example, the annotations, subtitles, and audio commentary from the second media asset are inserted over the first media asset's video content to replace the subtitles and audio commentary from the first media asset.

In some approaches, the system enhances the media asset by replacing audio or textual content of the media asset being consumed with audio or textual content from a second media asset to enhance the viewer consumption based on their content preference. The second content may lead to similar programs and media assets and broaden the horizons of the consumer by providing audio or textual content from the second content that is tailored to the user's preferences, while also providing information.

Content preferences are valuable to a service and a consumer. By tracking content consumed by a viewer, an interactive content guidance application may replace parts of content being consumed on the device with parts of secondary content tailored to the user's preferences and indicate recommended content the viewer has yet to consume to enhance the consumer's experience. Viewer preferences about content may be input manually or developed based on viewing histories. For instance, an interactive content guidance application may suggest another segment of a program based on similarities (or differences) with previously consumed content. For a content delivery service, tracking a viewing history may generate valuable data that can be used to aid in content suggestion algorithms.

Accordingly, a plurality of annotations, subtitles and audio commentary may be identified based on the media content, and may be stored for retrieval based on which consumer profile (e.g., beginner, intermediate, advanced, etc.) is applied. The annotations, subtitles and audio commentary may be overlaid or otherwise displayed with the representation of the media content item on a display. The annotations, subtitles and audio commentary are also dynamic in that they can be changed and linked or modified for one more users.

In some approaches, replacement of content (e.g., annotations, subtitles, and audio commentary from the second media asset) is made to a first media asset to enhance the consumer's experience consuming the media asset. Replacement of content (e.g., annotations, subtitles and audio commentary from the second media asset) may lead to identification of similar programs and content.

In some embodiments described herein, a system is directed to enhancing a media asset to make the media asset more palatable to a consumer (e.g., a beginner) who would not typically be consuming the media asset, to encourage continued viewing. In some embodiments, a device (e.g., television) may identify that a viewer is present and watching the device. A device accesses the viewer's profile and determines if the viewer does not commonly consume a type of the selected program (e.g., soccer match) and as a result, is identified as a beginner consumer. If the viewer's profile does not commonly consume, the system modifies or enhances the media asset for the particular viewer based on the profile. The modifications may be to, e.g., replace a first audio of the first media asset with the second audio of the second media asset, replace first subtitles of the first media asset with the second subtitles of the second media asset, or inserting interactive content from a second media asset into the first media asset. For example, for a beginner consumer, the modifications may include inserting content (e.g., games rules, game statistics, team statistics, player statistics, team strategies and fantasy statistics) that provides explanations to the consumer about the media asset. In another example, for an intermediate consumer, the modifications may include inserting more detailed content (e.g., games rules, game statistics, team statistics, player statistics, team strategies and fantasy statistics) such that they provide a more comprehensive and dynamic user experience of the media asset to the consumer. Some embodiments of such a system may be utilized as an enhancement engine, e.g., as part of an interactive content guidance application, stored and executed by one or more of the memory and processors of a device or server to provide enhanced media assets (e.g., soccer matches, news reports).

In some embodiments described herein, enhancements of segments of a media asset with one or more annotations, second subtitles and second audio from the second media asset may be used for some duration or some episodes to, for example, reduce a difference between a correlation of a viewer profile and media asset metadata, so that the consumer does not leave or stop consuming the content. In some embodiments, enhancements (e.g., one or more annotations, second subtitles and second audio from the second media asset) may be gradually reduced as the consumer watches for some time or some episodes. Enhancements may be personalized segments such as segments/episodes/highlights, and may be based on, for example, a featured character (e.g., a primary protagonist, team member) of a particular archetype or played by a preferred actor or team. Enhancements may include segments/episodes/highlights based on a job or profession matching the consumer's preference. Enhancements may include segments/episodes/highlights based on a location to which the consumer has a connection. Other modifications may include replaying highlights, providing statistics, providing rules, matching genres, skipping scenes, re-ordering scenes, selecting a different segment that might be a closer match to a consumer profile, and/or providing external content (e.g., which includes an interaction with a preferred character or actor or athlete) as non-episodic content.

For instance, in many sporting events, each match may feature teams and players that resonate with consumers at different levels. For example, some consumers enjoy watching a soccer match from time to time, while others may watch every match. When a certain viewer sees the match, he or she may have a particular way he or she consumes the content, for example, with detailed statistics of the teams and players that are displayed during the soccer match, or a detailed explanation of a rule when a ruling is made by a referee. Suppose an enhancement engine was to at first censor or limit scenes with additional content (subtitles, statistics, rule explanations). In that case, initially, a consumer may not mind watching the soccer match without any modifications.

In another instance, while consuming news reports of a major event, the consumer may have different preferences. For example, with a news reports of an election, the consumer may prefer a news report that is fact-based, or satirical, or biased or some combination thereof. In selecting content (or segments/scenes), an enhancement engine may enhance the content by providing supplemental content focusing on the news event based on the consumer's preference (e.g., fun, satirical, fact-based, opinionated).

In some embodiments, the enhancement engine may select scenes or episodes based on a featured setting, such as a location, time period, or season. For instance, a viewer profile may identify that a viewer recently visited San Diego, and an enhancement engine may provide episodes or scenes that feature San Diego (or don't feature crimes in San Diego). Likewise, a viewer may prefer winter scenes or scenes in the 1990s (e.g., in flashbacks). Viewer profiles may be used in various ways to establish a connection to a content item. A viewer may begin watching a television program because of a profile match with location, time period, or season but may soon appreciate the story and continue to view additional episodes of the program.

In some embodiments described herein, enhancements may be implemented for a secondary viewer but may stop if the secondary viewer leaves the room (or otherwise ceases to watch a program). For instance, when multiple viewers start to watch a content item, an enhancement engine may identify each viewer in the room and access the metadata of the content for comparison to the corresponding profiles. Such a determination may be performed, for instance, with device detection, smartphones, RFID smartcards, cameras, microphones, and/or other IoT and smart devices. An enhancement engine may access a profile of each discovered viewer that may describe the viewer's likes, interests, preferred genres, favorite actors, favorite locations, favorite programs, currently viewed shows, shows added to a watch list, and other viewer profile fields. Upon the enhancement engine detecting the content metadata for a primary viewer profile, the enhancement engine may enhance program segments for some duration (or some episodes). Accordingly, a system may enhance a media asset a secondary viewer is present, in order to encourage the secondary viewer to watch more of the media asset.

Systems and methods are provided herein, for enabling a user to view enhanced media content, e.g., as they continue to watch the live stream or at a later point in time.

In some embodiments, a second recorded portion of the media asset stream is retrieved. The second recorded portion may have a start point and end point corresponding to the first media asset's timestamp.

In some embodiments, it is determined whether a first recorded portion and a second recorded portion are each portions of the same media asset of the media asset stream.

In some embodiments, in response to determining that the first recorded portion and the second recorded portion are each a portion of the media asset stream's same media asset, the second recorded portion is stitched (either directly or indirectly) to the first recorded portion.

In some embodiments, at least one recorded portion of the media asset stream is generated, e.g., automatically generated, for playback, e.g., on one or more user devices. At least one recorded portion of the media asset stream that is generated for playback may be displayed as picture-in-picture on the display of a live media asset stream. At least one recorded portion of the media asset stream that is generated for playback may be displayed on a user device that is different from the user device on which a live media asset stream is displayed.

In some embodiments, the system may identify user actions on a user device while consuming the content and may adjust the consumption of content based on the saved commands associate, with the consumer's profile. For example, the system may determine that the user is performing one or more of the following user actions: walking, driving, focused watching, on the move, focused watching from 10 ft, focused watching on a mobile device or a combination thereof, and in response the system may perform commands. For example, based on identifying one or more of the user actions, the system may perform commands that the consumer has saved into the consumer profile. For example, the system, in response to identifying user actions, may perform one or more of the following commands: enhance modulation, repeat critical parts, enhance volume control, provide dynamic subtitles or a combination thereof to improve the users viewing experience.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 depicts an illustrative example of a database for consumer profiles, in accordance with some embodiments of the disclosure;

FIG. 6 depicts an illustrative example of a database for consumer profiles associated with user actions, in accordance with some embodiments of the disclosure;

DETAILED DESCRIPTION

Figure 1:
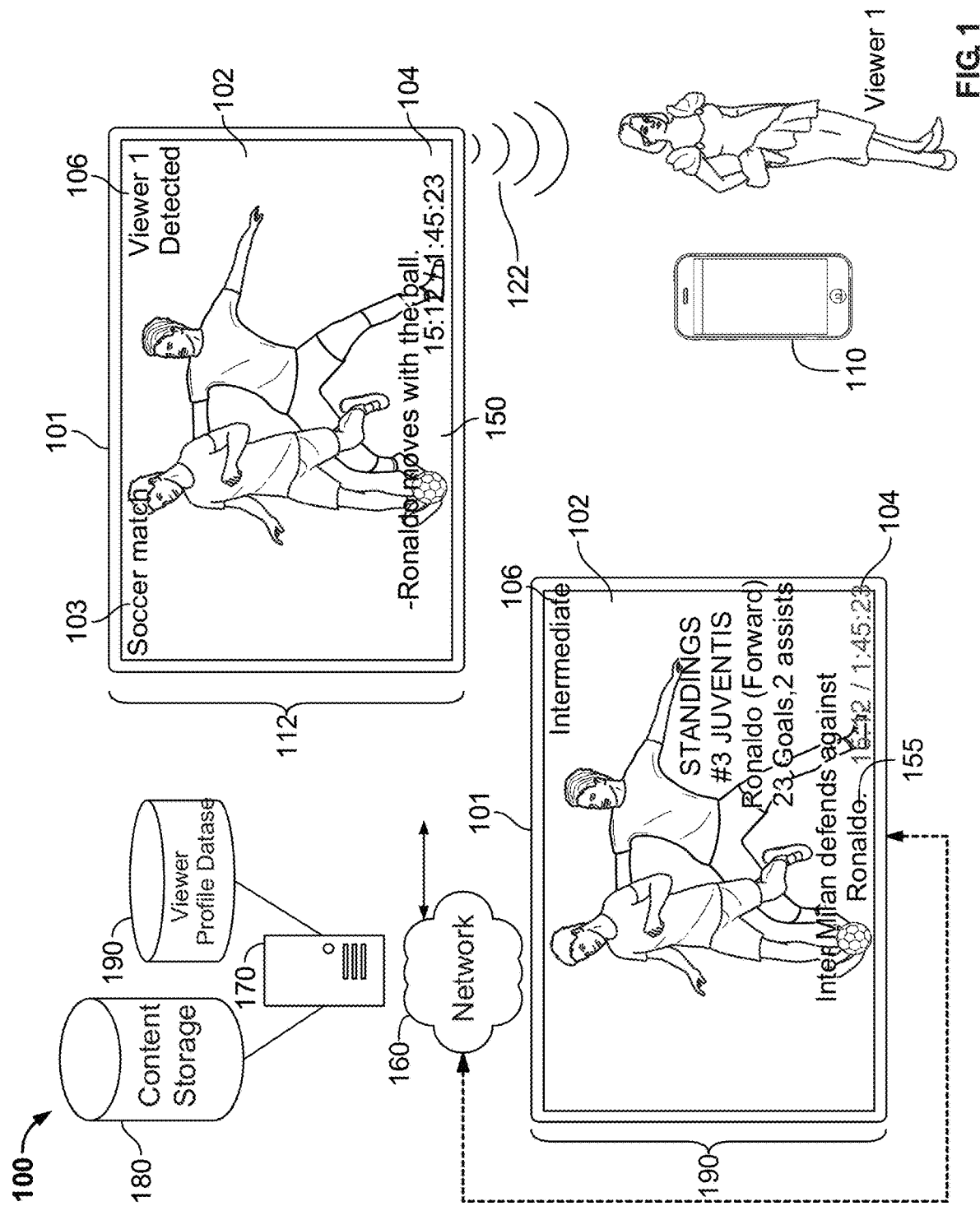
FIG. 1 shows an illustrative example of a system replacing content in a media asset, in accordance with some embodiments of the disclosure.

FIG. 1 shows an illustrative scenario 100 of a system replacing content in a media asset, in accordance with some examples of the disclosure. Scenario 100 of FIG. 1 illustrates a content delivery system accessible by device 101 via network 160. In scenario 100, device 101 is illustrated as a smart television and mobile device 110 is illustrated as a smartphone. By way of a non-limiting example, scenario 100 may depict enhancing, modifying, or replacing content to customize content to a consumer's preference to continue to consume the content in cases where, for instance, the content may not align with the consumer's preferences.

Figure 4:
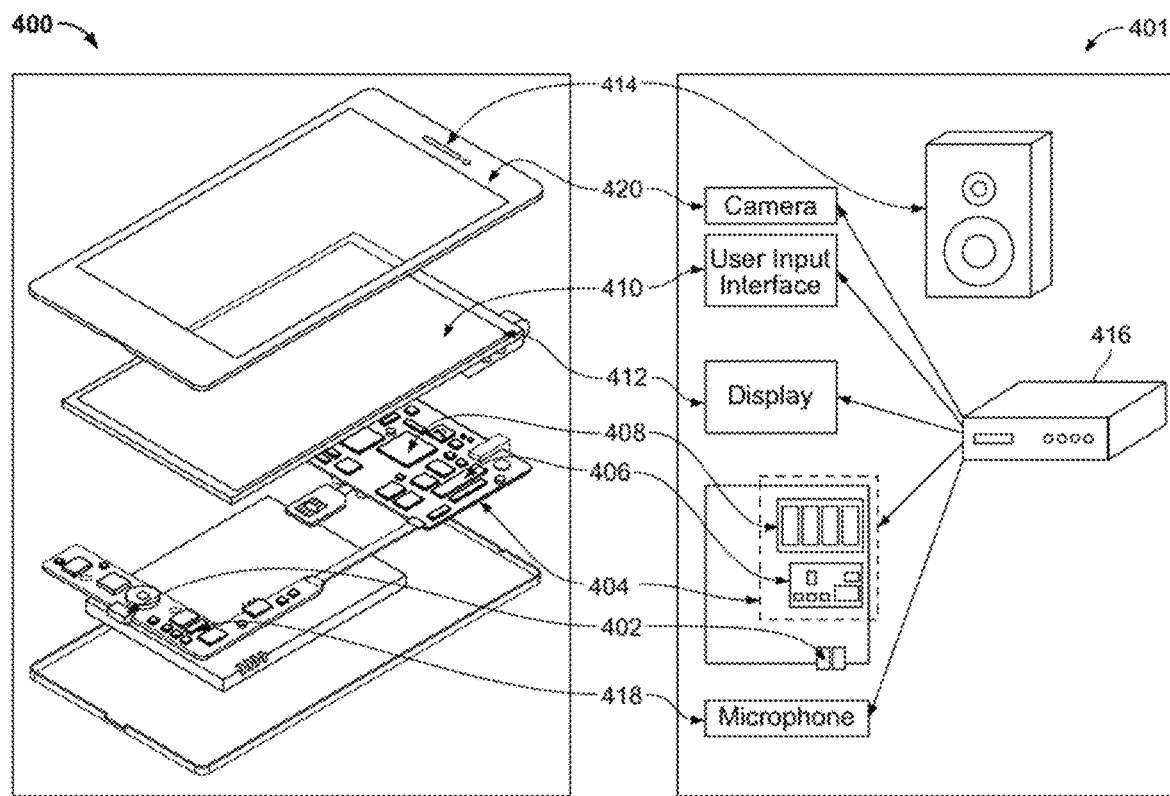
FIG. 4 depicts exemplary devices and related hardware for replacing supplemental content based on consumer profiles, in accordance with some embodiments of the disclosure.
Figure 5:
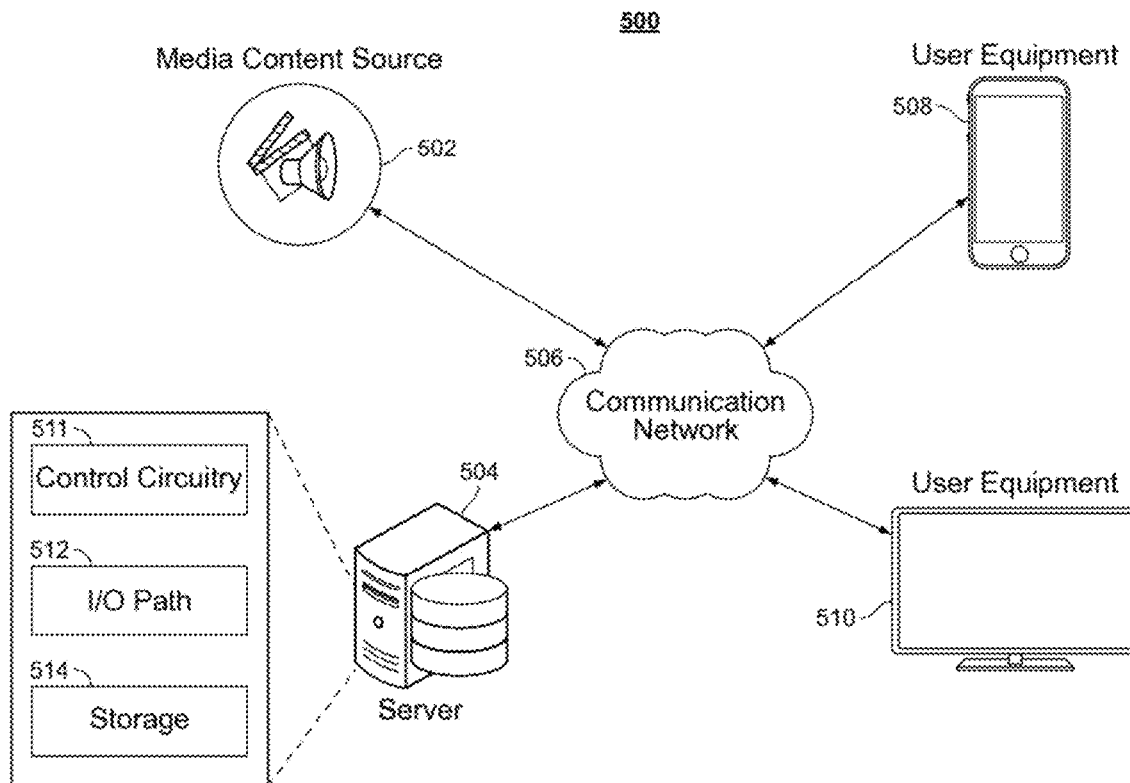
FIG. 5 depicts exemplary systems, servers and related hardware for replacing supplemental content based on consumer profiles, in accordance with some embodiments of the disclosure.

Each of the depicted devices 101 may be any suitable device such as a television, personal computer, laptop, smartphone, tablet, media center, video console, or any device as depicted in FIGS. 4 and 5. Device 101 should have the capabilities to receive input, communicate with a network, and provide content for consumption. Input for device 101 may be from any suitable input interface such as a touchscreen, touchpad, or stylus and/or may be responsive to external device add-ons, such as a remote control, mouse, trackball, keypad, keyboard, joystick, voice recognition interface, or other user input interfaces. Some embodiments may utilize an enhancement engine, e.g., as part of an interactive content guidance application, stored and executed by one or more of the memory and processors of device 101 to provide enhanced content. Mobile device 110 is shown as an exemplary device by which the system may detect a viewer's presence to determine the media asset consumption profile and tailor the enhancements. Other devices and methods may be used to detect the presence and identity of a viewer, including the viewer logging in to a user account. Mobile device 110 may be any device capable of communicating with device 101 as to the identity and relative proximity of a viewer. Mobile device 110 may be, for instance, a smartphone, tablet, watch, remote control, keyboard, smartcard, etc.

Interactive content guidance applications may take various forms, such as interactive television program guides, electronic program guides (EPG) and/or user interfaces, which may allow users to navigate among and locate many types of content including conventional television programming (provided via broadcast, cable, fiber optics, satellite, internet (IPTV), or other modes) and recorded programs (e.g., DVRs) as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content.

The interactive guidance application provided may be for content available through a television, or through one or more devices, or it may bring together content available both through a television and through internet-connected devices using interactive guidance. The content guidance applications may be provided as online applications (e.g., provided on a website), or as stand-alone applications or clients on handheld computers, mobile telephones, or other mobile devices. Various devices and platforms that may implement content guidance applications are described in more detail below.

As shown in scenario 100, device 101 generates a graphical user interface, e.g., user interface 102. In scenario 100, user interface 102 displays content delivered via network 160 by server 170 from, e.g., content storage 180. User interface 102 may display time 104, which indicates progress of 15:12 of the runtime 1:45:23. User interface 102 may list content type 103, which, for example, indicates the content type is "Soccer match." User interface 102 may display viewer status 106 to indicate whether a viewer, e.g., "VIEWER 1 DETECTED," has been identified as consuming the content. In some embodiments, the appearance of user interface 102 may occur as a result of input such as pause, resume, stop, other "trick-play" functions or menu navigational input.

In some embodiments, user interface 102 may access a viewer profile in the viewer profile database 190. Viewer profile database 190 may be an aggregator and/or retriever of multiple content delivery services. For instance, viewer profile database 190 may be able to access, download, and update viewer profiles via corresponding application programming interfaces (APIs) for each service. In some embodiments, viewer profile database 190 may have usernames and passwords stored for each individual. In some embodiments, viewer profile database 190 may have access limited to requesting profiles and enhanced content as needed, e.g., as a privacy concern.

In scenario 100, device 101 discovers the identity of consumer via consumer detection signal 122. In some embodiments, such as scenario 100, device 101 may emit consumer detection signal 122 to determine if any consumers (e.g., consumer devices) are within range. Using consumer detection signal 122 may be one of many approaches to detecting the presence and identity of a consumer. In some embodiments, an enhancement engine may infer that a particular consumer is consuming content via device 101 based on proximity of mobile device 110, e.g., as determined via consumer detection signal 122. Consumer detection signal 122 may be bidirectional. In some embodiments, consumer detection signal 122 may be one or more networks using Bluetooth, near-field communication (NFC), radio frequency, IEEE 802.11x (Wi-Fi), or other protocol(s). For instance, mobile device 110 may be a smartphone or NFC smartcard that relays an encoded consumer account. In some embodiments, consumer detection signal 122 may create a local area network and/or an ad-hoc network with mobile device 110. In some embodiments, consumer detection signal 122 may use pre-established Wi-Fi to communicate. In some embodiments, consumer detection signal 122 may connect to a common server by, e.g., accessing an activation website communicated by on-screen information, text message, QR codes, infrared, audio, or other communication. In some embodiments, a consumer may use a keypad and log in to a consumer account, e.g., via infrared remote.

In scenario 100, device 101 discovers the identity of a consumer via consumer detection signal 122. In some embodiments, mobile device 110 may respond to consumer detection signal 122 from device 101 to acknowledge that a guest device is within range. For instance, device 101 and mobile device 110 may perform a handshake and/or communicate via viewer detection signal 122. A handshake may be used to exchange information to establish a communication protocol prior to full communication. In some embodiments, mobile device 110 may emit viewer detection signal 122 to determine if any devices are within range, and device 101 may acknowledge, e.g., via consumer detection signal 122. In such embodiments, privacy may be a concern, e.g., with subscription usernames and/or billing information, and data may be shared under pseudonyms or encrypted identifications. Device 101 and mobile device 110 may also communicate through a remote network, e.g., network 160.

For instance, by way of a non-limiting example, a consumer may consume content, such as a movie, a sporting event, or a news report, on a television, e.g., device 101. In such an example, device 101 may send a viewer detection signal to detect if any mobile devices are around, which may indicate that a particular consumer is viewing the playback on device 101. If a mobile device, e.g., mobile device 110, responds, device 101 may communicate with server 170 to deliver enhanced content 180 for the respective consumer, e.g., "VIEWER IDENTIFICATION" with viewer status 106 as "INTERMEDIATE." The enhancement of the content is determined based on a particular consumer's lookup table and the preferences associated with the particular consumer. For example, a particular consumer may consume many hours of the type of content (e.g., soccer match) and prefer one set of color commentators. For example, the consumer may prefer radio commentators for the soccer match while consuming the video content being broadcast on device 101. In some embodiments, the system identifies, based on a mapping logic from the lookup table, a media asset consumption profile (e.g., fun, beginner, intermediate, advanced, comical or satirical profile) for "VIEWER 1." Based on the mapping logic of the viewer profile to the first media asset and the metadata, an enhanced presentation of the content 190 is generated for audible and/or visible presentation to the consumer via device 101 based on the consumer's preferences, for instance as an overlay, in synchronization with the presentation of the video content item via device 101. The mapping logic includes for each consumer a list of content types, tags associated with the content types and the media asset consumption profile.

Scenario 100 depicts display on device 101 of a first media asset 112 including the audible and/or visible presentation and first subtitles 150, based on the original presentation of the media asset. In some embodiments, after identifying a viewer's media asset profile, the first media asset is enhanced to generate an enhanced media asset 190 (e.g., first media asset with replacement content) for display on device 101. In the enhanced media asset 190, such as a film or television episode or a sporting event, certain scenes may be edited, removed, replaced, modified, etc., in order to accommodate a consumer and encourage further consumption by the consumer. For example, if the consumer prefers a particular commentator, the system replaces the audio for the first media asset with an audio from a second media asset. For example, the audio from a radio station covering a soccer match is inserted over the video of the match. In some embodiments, the scene modifications and/or enhancements may be determined by the associated viewer profile. In some embodiments, event type metadata (e.g., as depicted in FIG. 3) may be compared to a viewer preferences profile (e.g., as depicted in FIG. 3) in order to determine whether an event type (e.g., soccer match) needs to be replaced, extended, or otherwise modified or enhanced. For example, a scene may be enhanced by inserting a color commentator from a radio station when a video is being enhanced for a viewer identified as "VIEWER 1," if the viewer does not enjoy a particular event type (e.g., soccer match), in accordance with her viewer profile. In some embodiments, a scene may be focused on a particular character, setting or athlete. In some embodiments, the system replaces the subtitles for the first media asset with subtitles from a second media asset (e.g., different commentators). For instance, a focused scene may include extended views of a particular play in a soccer match or a particular accomplished actor or athlete preferred by VIEWER 1, in accordance with her viewer profile. Scenes may be otherwise modified, such as in the case of modified scene 190, which may, e.g., have been a flashback/highlight scene moved to later in the story so that a viewer, such as VIEWER 1, may better remember a character's motivation in the following scene, in accordance with preferences indicated in her viewer profile. Additional content 155 may be inserted into the presentation of the video, for example, such that enhanced scenes that may provide supplemental content (e.g., statistics, games rules, player or actor link) that occur more frequently in the beginning than towards the end, because a viewer will likely be willing to watch scenes that may be undesirable after the viewer has invested in a majority of the content and would want to see how the program ends. In some embodiments, enhancement may occur throughout the content, e.g., uniformly or as needed.

While additional content 155 is shown as a list on the display, additional content may be provided in any suitable size, shape, and location in a guidance application display. For example, additional content 155 may be provided as a horizontally rectangular shape adjacent to replacement subtitles 155. Also, additional content may be overlaid over content or a guidance application display or embedded within a display. The additional content 155 may also include text, images, rotating images, video clips, or other types of content described above. Additional content 155 may be stored in a user equipment device having a guidance application, in a database connected to the user equipment, in a remote location (including streaming media servers), or in other storage means, or a combination of these locations.

Figure 2:
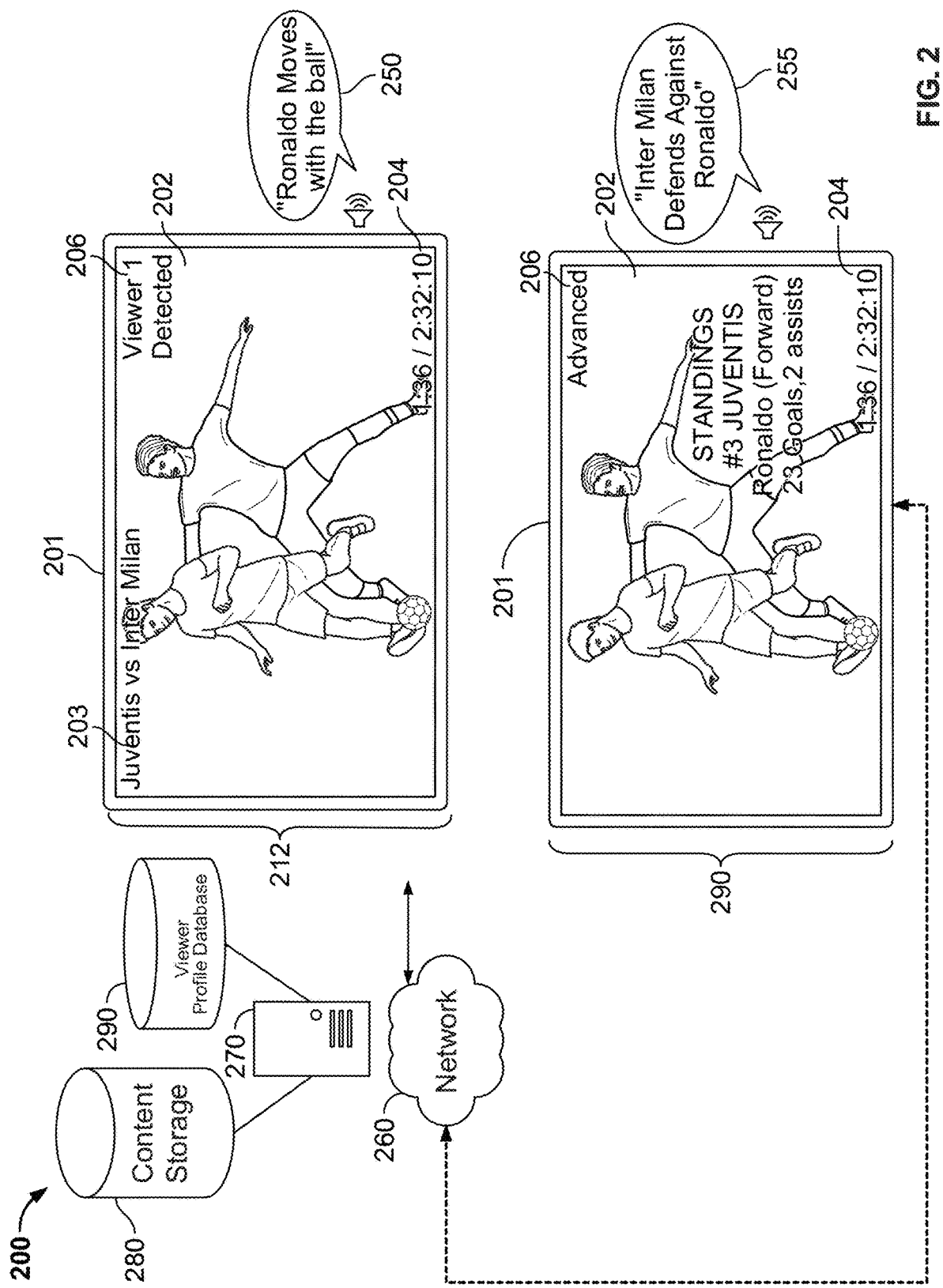
FIG. 2 shows an illustrative example of a system replacing content in a media asset, in accordance with some embodiments of the disclosure.

FIG. 2 shows an illustrative scenario 200 of a system replacing content in a media asset, in accordance with some examples of the disclosure. Scenario 200 of FIG. 2 illustrates a content delivery system accessible by device 201 via network 260. In scenario 200, device 201 is illustrated as a smart television. By way of a non-limiting example, scenario 200 may depict enhancing, modifying, or replacing content to customize content to a consumer's preference so that the consumer may continue to consume the content in cases where, for instance, the content may not align with the consumer's preferences.

Each device 201 may be any suitable device such as a television, personal computer, laptop, smartphone, tablet, media center, video console, or any device as depicted in FIGS. 4 and 5. Device 201 should have the capabilities to receive input, communicate with a network, and provide content for consumption. Input for device 201 may be any suitable input interface such as a touchscreen, touchpad, or stylus and/or may be responsive to external device add-ons, such as a remote control, mouse, trackball, keypad, keyboard, joystick, voice recognition interface, or other user input interfaces. Some embodiments may utilize an enhancement engine, e.g., as part of an interactive content guidance application, stored and executed by one or more of the memory and processors of device 201 to provide enhanced content. Other devices and methods may be used to detect the presence and identity of a viewer, including the viewer logging in to a user account.

In scenario 200, device 201 discovers the identity of a consumer in a way similar to that described in FIG. 1. In response to identifying the consumer, the system may perform enhancement to tailor the content to the user's preferences. For instance, by way of a non-limiting example, the consumer is watching content on a television, such as a movie, a sporting event, a news report. In such an example, device 201 may send a discovery signal to detect if any mobile devices are around, which may indicate that a particular consumer is watching content on a mobile device 210. If a mobile device, e.g., mobile device 210, responds, device 201 may communicate with server 270 to deliver enhanced content 290 for the respective consumer, e.g., "VIEWER 1" with viewer status 106 as "ADVANCED." The enhancement of the content is determined based on a lookup table of a particular consumer and the preferences associated with the particular consumer. For example, an advanced consumer has consumed a specific number of hours (e.g., more than 150 hours) of the type of content (e.g., soccer match) and prefers one audio commentator. For example, the consumer prefers specific audio commentators for the soccer match while consuming the video content being broadcast on device 201. In some embodiments, the system identifies, based on a mapping logic from the lookup table, a media asset consumption profile (e.g., fun, beginner, intermediate, advanced, comical or satirical) for "Viewer 1." Each of the profiles is associated with a certain viewing time (e.g., hours consuming content), while monitoring the commands received on the content. For example, while consuming a particular content item (a soccer match), a user accesses secondary content on device 201 or another device. In another example, the user looks up content, such as game rules, game statistics and/or player information, on a personal mobile device 210. Based on the mapping logic of the viewer profile to the first media asset and the metadata, an enhanced presentation of the media asset 290 is generated including second audio content 250 and/or visible presentation to the consumer via device 201 based on the consumer's preferences, for instance as an overlay, in synchronization with the presentation of the video content item via device 201. The mapping logic includes, for each consumer, a list of content types, tags associated with the content types and the media asset consumption profile.

Scenario 200 depicts display on device 201 of a first media asset 212 including the audible and/or visible presentation, and first audio 250, based on the media asset's original presentation. In some embodiments, after identifying a viewer's media asset profile, the first media asset 212 is enhanced to generate an enhanced media asset 290 (e.g., first media asset with replacement content). In the enhanced media asset, such as a film or television episode or a sporting event, certain scenes may be edited, removed, replaced, modified, etc., in order to accommodate a consumer and encourage further consumption by the consumer. In some embodiments, the scene modifications and/or enhancements may be determined by the associated viewer profile. In some embodiments, event type metadata (e.g., as depicted in FIG.

3) may be compared to the viewer preferences profile (e.g., as depicted in FIG. 3) in order to determine whether an event type (e.g., soccer match) needs to be replaced, extended, or otherwise modified or enhanced. For example, a scene may be enhanced by inserting a second audio 250 from a second media asset when a video from the first media asset is being enhanced for a viewer identified as "VIEWER 1," if the viewer does not enjoy a particular event type (e.g., soccer match), in accordance with her viewer profile. In some embodiments, a scene may be focused on a particular character, setting or athlete. For instance, a focused scene may include extended views of a particular play in a soccer match or a particular accomplished actor or athlete preferred by VIEWER 1, in accordance with her viewer profile. Scenes may be otherwise modified, such as in the case of modified scene 290, which may, e.g., have been a flashback/highlight scene moved to later in the story so that a viewer, such as VIEWER 1, may better remember a character's motivation in a following scene, in accordance with preferences indicated in her viewer profile. The second audio 255 from a second media asset may be inserted into the presentation of the enhanced scenes.

FIG. 3 depicts an illustrative table 300 of a database for consumer profiles, in accordance with some examples of the disclosure. A media device maintains the database shown in FIG. 3. In some embodiments, the database may be maintained at a remote server or storage database. For explanatory purposes, table 300 features data of profiles depicted in scenario 100 of FIG. 1 or 200 of FIG. 2; however, more/fewer/different event types and/or profiles may be used in table 300. Table 300 may be displayed as part of an interactive display application and may be adjustable in a manual or automatic setting. As shown, the table 300 in FIG. 3 includes a row for each of event type 302A, 302B and 302C. Table 300 includes a column for event tags 304 and profiles 306.

These event types 302 may be manually entered or automatically identified based on a consumer's viewing habits. The event types 302 may be grouped based on a sport (e.g., cricket, baseball), genre, news reporting, reality television, a combination thereof or any other suitable grouping. The event tags 304 may track the consumer's consumption of the event type, for example, the number of events watched, the supported teams, the hours watched, a combination thereof or any other suitable consumer consumption tracking mechanism. The event tags 304 may be based on one user consuming the content or based on two or more consumers in the proximity of the media devices 101 and 201. In some embodiments, such as in scenario 200, device 201 discovers the identity of a viewer via a camera, such as camera 420 of FIG. 4. In some embodiments, device 201, camera 420, server 270, and/or viewer profile database 290 may be used to determine the identity of one or more viewers. In some embodiments, in scenario 200, the camera identifies two viewers who are, e.g., a primary viewer and a secondary viewer. In some embodiments, a primary viewer may be determined to be the viewer selecting the content (e.g., providing input). In some embodiments, a primary viewer may be determined by the enhancement engine as the viewer who best matches the content, e.g., by correlation of viewer profile and the content metadata.

For instance, by way of a non-limiting example, in scenario 200, the content may be presented for "VIEWER A" and modified/enhanced for "VIEWER B," in order to encourage VIEWER B to continue to watch with VIEWER A. In some embodiments, camera 420 may detect that VIEWER B is in the room or not. In some embodiments, camera 420 may detect that VIEWER B is watching device 201 or not. The enhancement engine may provide enhanced content if VIEWER B is detected as present and/or viewing content via device 201.

Based on the identified event tags 304, a profile may be determined with the preferences associated with the profile. The profile may be one selected from one of fun profile, beginner profile, intermediate profile, advanced profile, a cynical profile, comedy profile or a custom profile. In some embodiments, the profile may be unique to each consumer, for example, a Viewer 1 profile that includes funny commentary from a Twitter feed along the side of the video. In another example, the beginner profile may be associated with a consumer of a soccer match that, based on viewing habits, does not usually watch soccer matches, and, as a result, the beginner profile may provide links (e.g., strategies, explanations, rules, etc.) to explanatory content to enhance the consumer's consumption of the soccer match. Each profile may include customizable features that are associated with a viewing device on which the consumer is consuming the media asset.

In some embodiments, a control command that is received from the consumer during consumption may be tracked and the system may predict the same control action to enhance the media asset. For example, if the user enters a command to look up statistics and rules of the game, a predicted action is also to look up statistics and rules of the game when the consumer is consuming the first media asset. As the consumer continues to enter a particular command each time the consumer is consuming an event type (e.g., soccer match), the media device increases the confidence score associated with the control action and may automatically perform the action when the consumer is consuming the media asset based on the consumer's preference.

As shown in FIG. 3, the media device stores in memory instructions for tracking and performing control actions based on the identified profile based on the event types and the event tags. In some embodiments, the media device monitors the control commands received during consumption of the media asset and updates the stored profile's status with the control commands. Based on the control commands, the media device may predict the control action to perform automatically when consuming a media asset that belongs in the event type (e.g., soccer). For example, a first consumer may enter a command to change the audio (e.g., to another commentator) for each time a particular team (e.g., Juventus FC) is playing, and in response, the system may predict a control action to change the audio the next time the same content type is being consumed and Juventus FC is playing. In another example, a command is obtained each time the particular team (e.g., Juventus FC) is playing, but the command varies. In such an example, the control action may be randomly selected, or a most conservative control action may be employed. The most conservative action may be when the video and audio are changed when the particular team (e.g., Juventus FC) is playing.

FIG. 4 depicts exemplary devices and related hardware for replacing supplemental content based on consumer profiles, in accordance with some examples of the disclosure. FIG. 4 shows generalized embodiments of illustrative user equipment devices 400 and 401. For example, user equipment device 400 may be a smartphone device. In another example, user equipment system 401 may be a user television equipment system (e.g., the computing device 106). In yet another example, the user equipment system 401 may be a media device. The user television equipment system 401 may include a set-top box 416. The set-top box 416 may be communicatively connected to a camera 420, a microphone 418, a speaker 414, and a display 412. In some embodiments, the camera may detect users in the media presentation environment (i.e., the proximity of the media device). In some embodiments, the microphone 418 may detect sound (e.g., background noise) in the media presentation environment. In some embodiments, the display 412 may be a television display or a computer display (i.e., the proximity of the media device). In some embodiments, the set-top box 416 may be communicatively connected to a user input interface 410. In some embodiments, the user input interface 410 may be a remote-control device (e.g., the remote control). The set-top box 416 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 5. Each one of the user equipment device 400 and the user equipment system 401 may receive content and data via input/output (I/O) path 402. The I/O path 402 may provide content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths (described below). I/O functions may be provided by one or more of these communications paths, but are shown as a single path in FIG. 4 to avoid overcomplicating the drawing.

The control circuitry 404 may be based on any suitable processing circuitry, such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 404 executes instructions for a media device stored in memory (i.e., the storage 408). Specifically, the control circuitry 404 may be instructed by the media device to perform the functions discussed above and below. In some implementations, any action performed by the control circuitry 404 may be based on instructions received from the media device.

In client/server-based embodiments, the control circuitry 404 may include communications circuitry suitable for communicating with a media device server or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. The storage 408 may be used to store various types of content described herein as well as media device data described above. For example, the storage 408 may be used to store the output volume adjustment profiles described in FIG. 2. Nonvolatile memory may also be used (e.g., to launch a boot-up routine and other instructions). Cloud-based storage, described in relation to FIG. 5, may be used to supplement the storage 408 or instead of the storage 408.

The control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. The control circuitry 404 may also include scaler circuitry for upconverting and downconverting content into the preferred output format of the user equipment 400. The circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If the storage 408 is provided as a separate device from the user equipment device 400, the tuning and encoding circuitry (including multiple tuners) may be associated with the storage 408.

A user may send instructions to the control circuitry 404 using the user input interface 410. The user input interface 410 may be any suitable user interface, such as a remote control, mouse, trackball, keypad, keyboard, touchscreen, touchpad, stylus input, joystick, voice recognition interface, or other user input interfaces. The display 412 may be provided as a stand-alone device or integrated with other elements of each one of the user equipment device 400 and the user equipment system 401. For example, the display 412 may be a touchscreen or touch-sensitive display. In such circumstances, the user input interface 410 may be integrated with or combined with display 412. The display 412 may be one or more of a monitor, a television, a display for a mobile device, or any other type of display. A video card or graphics card may generate the output to the display 412. The video card may be any processing circuitry described above in relation to the control circuitry 404. The video card may be integrated with the control circuitry 404. Speakers 414 may be provided as integrated with other elements of each one of the user equipment device 400 and the user equipment system 401 or may be stand-alone units. The audio component of videos and other content displayed on the display 412 may be played through the speakers 414. In some embodiments, the audio may be distributed to a receiver (not shown), which processes and outputs the audio via speakers 414.

The media device may be implemented using any suitable architecture. For example, it may be a stand-alone application wholly implemented on each one of the user equipment device 400 and the user equipment system 401. In such an approach, instructions of the application are stored locally (e.g., in the storage 408), and data for use by the application is downloaded on a periodic basis (e.g., from an out-of-band feed, from an Internet resource, or using another suitable approach). The control circuitry 404 may retrieve instructions of the application from the storage 408 and process the instructions to rearrange the segments as discussed. Based on the processed instructions, the control circuitry 404 may determine what action to perform when input is received from the user input interface 410. For example, movement of a cursor on a display up/down may be indicated by the processed instructions when the user input interface 410 indicates that an up/down button was selected.

In some embodiments, the media device is a client/server-based application. Data for use by a thick or thin client implemented on each one of the user equipment device 400 and the user equipment system 401 is retrieved on demand by issuing requests to a server remote to each one of the user equipment device 400 and the user equipment system 401. In one example of a client/server-based guidance application, the control circuitry 404 runs a web browser that interprets web pages provided by a remote server. For example, the remote server may store the instructions for the application in a storage device. The remote server may process the stored instructions using circuitry (e.g., the control circuitry 404) and to modify a stored relationship status based on a relationship and user feedback and to perform actions automatically that control the playing of the content as discussed. In some embodiments, the remote server may process the stored instructions using circuitry (e.g., the control circuitry 404) based a change in the number of users in the proximity of the media device. For example, a second user entering the proximity and similarly leaving the proximity.

In some embodiments, the media device is downloaded and interpreted or otherwise run by an interpreter or virtual machine (run by the control circuitry 404). In some embodiments, the media device may be encoded in the ETV Binary Interchange Format (EBIF), received by the control circuitry 404 as part of a suitable feed, and interpreted by a user agent running on the control circuitry 404. For example, the media device may be an EBIF application. In some embodiments, the media device may be defined by a series of JAVA-based files that are received and run by a local virtual machine or other suitable middleware executed by control circuitry 404. In some of such embodiments (e.g., those employing MPEG-2 or other digital media encoding schemes), the media device may be, for example, encoded and transmitted in an MPEG-2 object carousel with the MPEG audio and video packets of a program.

FIG. 5 depicts exemplary systems and servers and related hardware for replacing supplemental content based on consumer profiles, in accordance with some examples of the disclosure. User equipment devices 508 and 510 (such as the computing device 106) may be coupled to communication network 506. The communication network 506 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths such as short-range communication paths, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via the communication network 506.

The system 500 includes a media content source 502 and a server 504. Communications with the media content source 502 and the server 504 may be exchanged over one or more communications paths but are shown as a single path in FIG. 5 to avoid overcomplicating the drawing. In addition, there may be more than one of each of the media content source 502 and the server 504, but only one of each is shown in FIG. 5 to avoid overcomplicating the drawing. If desired, the media content source 502 and the server 504 may be integrated as one source device.

In some embodiments, the server 504 may include control circuitry 511 and a storage 514 (e.g., RAM, ROM, hard disk, removable disk, etc.). The server 504 may also include an input/output path 512. The I/O path 512 may provide device information, or other data, over a local area network (LAN) or wide area network (WAN), and/or other content and data to the control circuitry 511, which includes processing circuitry, and the storage 514. The control circuitry 511 may be used to send and receive commands, requests, and other suitable data using the I/O path 512. The I/O path 512 may connect the control circuitry 511 (and specifically processing circuitry) to one or more communications paths.

The control circuitry 511 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 511 executes instructions for an emulation system application stored in memory (e.g., the storage 514). Memory may be an electronic storage device provided as the storage 514 that is part of the control circuitry 511.

The server 504 may retrieve guidance data from media content source 502, process the data as will be described in detail below, and forward the data to the user equipment devices 508 and 510. The media content source 502 may include one or more types of content distribution equipment including an audio distribution facility, a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). The media content source 502 may include cable sources, satellite providers, on-demand providers, Internet providers, over-the-top content providers, or other providers of content. The media content source 502 may also include a remote media server used to store different types of content (including video content selected by a user) in a location remote from any of the client devices.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network (such as the Internet) via communication network 506. In such embodiments, user equipment devices may operate in a peer-to-peer manner without communicating with a central server.

FIG. 6 depicts an illustrative table 600 of a database for consumer profiles associated with user actions, in accordance with some examples of the disclosure. A media device maintains the database shown in FIG. 6. In some embodiments, the database may be maintained at a remote server or storage database. For explanatory purposes, table 600 features data of profiles depicted in scenarios 100 of FIG. 1 or 200 of FIG. 2; however, more/fewer/different actions and/or profiles may be used in table 600. Table 600 may be displayed as part of an interactive display application and may be adjustable manually or automatically. As shown, table 600 from FIG. 6 includes a row for each of event type 602A, 602B, 602C, 602D, 602E, and 602F. Table 600 includes a column for action tags 604 and profiles 606 with associated enhancements.

These actions tags 604 may be manually entered or automatically identified based on sensors within the user's device. For example, in action 602A, the consumer is consuming an audiobook while walking. To enhance the enjoyment of the content, the system may employ enhancements to the audio book's presentation. For example, in response to identifying the user actions, the system may perform control actions stored in the table associated with the consumer's profile. For example, the system may automatically turn off modulations, repeat critical parts of the book, enable volume control, a combination thereof or any other suitable enhancement that has been identified as a command received from the consumer. In another example, the system may enable an automatic repeat of critical parts of the book based on metadata associated with the media asset. The actions tags 604 associated with a event type 602A, 602B, 602C, 602D, 602E, and 602F may be grouped based on a sport (e.g., cricket, baseball), genre, news reporting, reality television, a combination thereof or any other suitable grouping. The action tags 604 may be identified using sensors embedded in the user device or any other suitable consumer consumption tracking mechanism. Based on the identified action tags 604, a profile may be determined with the preferences of control actions associated with the profile. The profile may be one with a default setting or one that is customized to the preferences of the consumer. For example, the profile may include control actions selected from one or more of enhance modulation, repeat critical scenes, enable volume control, enable dynamic subtitles content, enable dynamic audio content a combination thereof or any other suitable mechanism preferred by the consumer.

Figure 7:
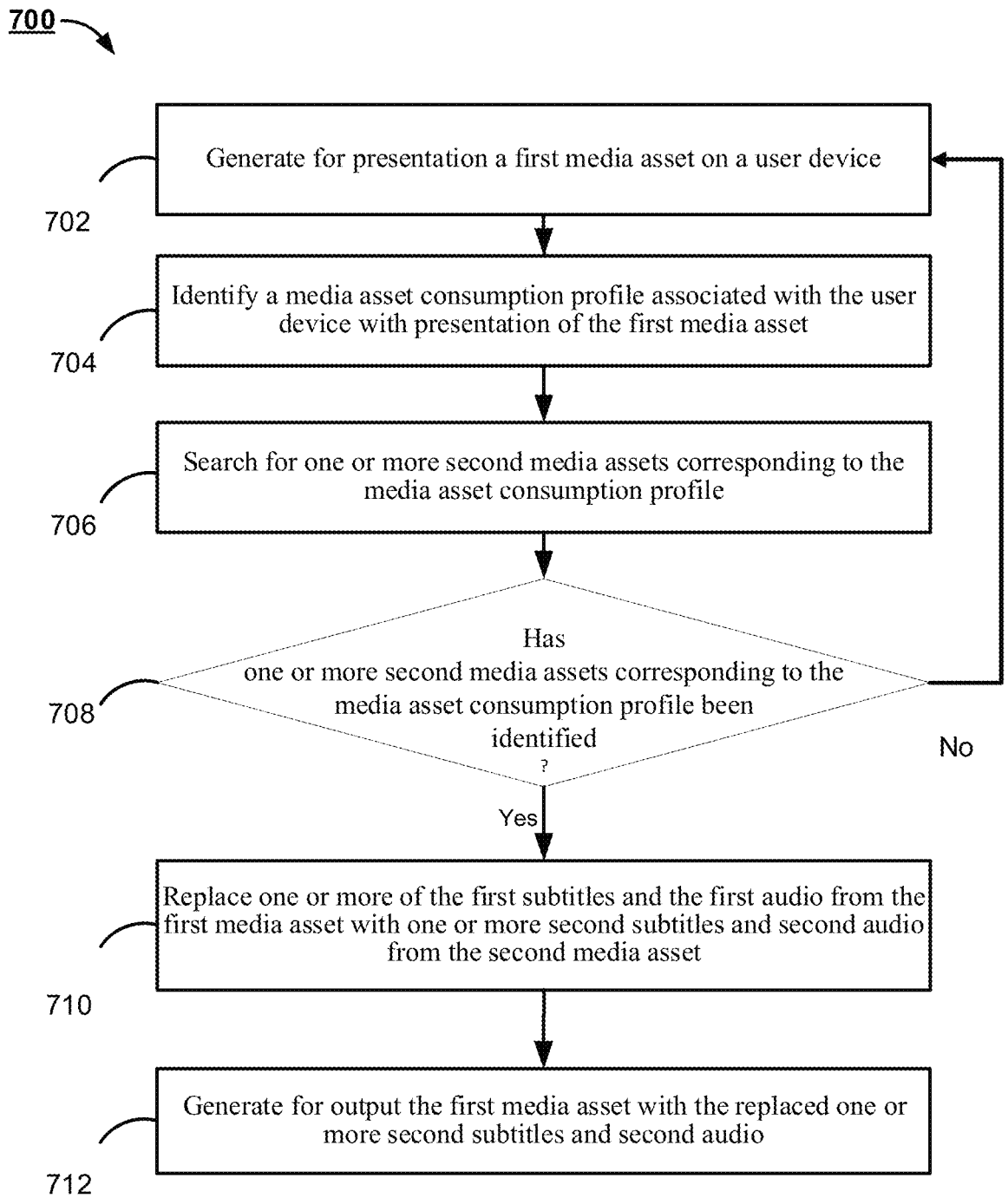
FIG. 7 is a flowchart of a detailed illustrative process for replacing content in a media asset, in accordance with some embodiments of the disclosure.

FIG. 7 is a flowchart of a detailed illustrative process 700 for replacing content in a media asset, in accordance with some examples of the disclosure. The process 700 may be executed by the control circuitry 404 (e.g., in a manner instructed to the control circuitry 404 by the media device). The control circuitry 404 may be part of user equipment (e.g., a device that may have any or all of the functionality of the user equipment devices 508 or 510) or of a remote server separated from the user equipment by way of the communication network 506, or distributed over a combination of both. It should be noted that the process 700, or any step thereof, could be performed on, or provided by, any of the devices shown in FIGS. 1, 2 and 4-5 or the steps performed in FIGS. 8 and 9.

The process 700 begins at step 702, when the control circuitry (e.g., of device 508 and/or 510) generates for presentation a first media asset on the user device, the first media asset comprising first metadata, first subtitles and first audio. For example, the device presents for display a soccer match between Juventus FC and Inter Milan with information about the match and commentators providing audio play-by-play commentary.

At step 704, the media device (e.g., via the control circuitry 404) identifies a media asset consumption profile associated with a user consuming the content. For example, the control circuitry 404 may process signals from camera 420 to detect a consumer in the proximity of the media device. In some embodiments, the media device (e.g., via the control circuitry 404) may detect a particular consumer with preferences for consuming the media asset. For example, the consumer may be designated as an advanced consumer based on the number of events (e.g., soccer matches) consumed, the number of hours spent consuming this content (e.g., soccer match), or a particular team listed (e.g., Juventus FC) a combination thereof or any other suitable mechanism to track user's preferences in consuming the media asset. For example, the consumer may have manually entered interest in consuming soccer matches. In another example, the consumer is identified as a "fun" consumer based on the preferences the consumer has provided. For example, the consumer enjoys watching soccer matches with funny commentators or scrolling through funny tweets on Twitter from the players. In another example, when a new consumer is identified with no media consumption profile, the device may default to a beginner media asset consumption profile with options or notifications that prompt the user to provide feedback on the supplemental content. For example, a notification may be provided regarding accessing the statistics after a player scores.

At step 706, the media device (e.g., via the control circuitry 404) searches for one or more second media assets corresponding to the media asset consumption profile. For example, based on the consumer being an advanced consumer, the control circuitry 404 may search for one or more types of content (e.g., statistics, game rules, game strategies) that the advanced consumer prefers to view while consuming this first media asset.

At step 708, the media device (e.g., via the control circuitry 404), searches for one or more second media assets corresponding to the media asset consumption profile identified in 704. In some embodiments, in response to identifying an advanced consumer in step 704, with preferences, the media device searches for statistics, match rules, additional audio commentators and other information related to the first media asset and the media asset consumption profile. For example, as the advanced consumer is consuming the first media asset, a foul is made, and the advanced consumer wants to know what rule is applied and how it was applied, a link is provided to an explanation of the rule. In another example, as the consumer prefers certain audio commentators, the system searches for and identifies broadcast commentators preferred by the consumer. In yet another example, the advanced consumer may prefer statistics for all the teams, the players and the rules displayed on the side of the display in the form of a banner or another suitable way of presenting the information. In some embodiments, the preferences are identified based on viewing habits and commands received from the consumer while the consumer is consuming the content. In some embodiments, the system receives a command that controls playback of the first media asset after a certain event occurs (e.g., goal is scored) in the media asset, for example, to search for statistics, team standings, team tweets, player tweets; lower the volume of the media device playing the first content item; repeat the critical part of the first media asset; or adjust modulation of the presentation. If the control circuitry 404 does not identify one or more second media assets corresponding to the media asset consumption profile, ("No" at 708), the process 700 may return to 702 and continue to generate for presentation the first media asset. Otherwise, if the control circuitry 404 identifies one or more second media assets corresponding to the media asset consumption profile ("Yes" at 708), the process 700 may proceed to step 710.

In some embodiments, the media device (e.g., via the control circuitry 404) determines if the command that controls playing the first content was received within a predetermined time from the consumer beginning to play the first media asset. In some embodiments, instead of receiving a command, the media device may identify a user action that indicates disengagement from the playing of the first content. For example, the user actions that indicate disengagement may be any one or more of turning away from the media device, focusing on a second media device, leaving the room (e.g., leaving the proximity of the media device) or any combination thereof.

At step 710, the media device (e.g., via the control circuitry 404) replaces one or more of the first subtitles and the first audio from the first media asset with one or more second subtitles and second audio from a second media asset. For example, the media asset is broadcast by multiple stations with multiple commentators; the audio of commentators preferred by the consumer is inserted over the video content of the first media asset.

At step 712, the media device (e.g., via the control circuitry 404) generates for output the first media asset with the replaced one or more second subtitles and second audio. For example, the media device may generate the video of the first media asset and overlay, in synchronization with presentation of the video content item via device 201, the presentation of the audio and/or subtitles of the second media asset. In some embodiments, the second media asset and the first media asset may contain the same video content and different audio content.

In some embodiments, the media device automatically performs an action (e.g., via the control circuitry 404) that controls the playing of the second content overlaid over the video content of the first media device. For example, the media device decreases the output volume level based on the command received on the first video content and overlays the audio of the second media device at a lower volume.

Figure 8:
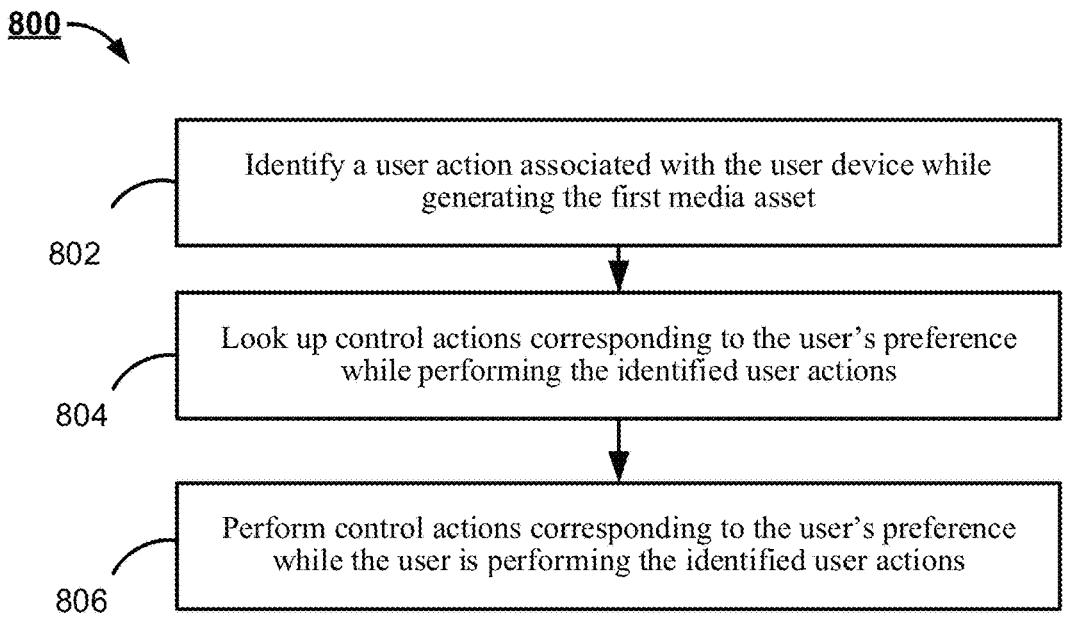
FIG. 8 is a flowchart of a detailed illustrative process for replacing content in a media asset based on user actions, in accordance with some embodiments of the disclosure.

FIG. 8 is a flowchart of a detailed illustrative process 800 for replacing content in a media asset while the user is performing a user action, in accordance with some examples of the disclosure. The process 800 may be executed by the control circuitry 404 (e.g., in a manner instructed to the control circuitry 404 by the media device). The control circuitry 404 may be part of user equipment (e.g., a device that may have any or all of the functionality of the user equipment devices 508 or 510) or of a remote server separated from the user equipment by way of the communication network 506, or distributed over a combination of both. It should be noted that process 800, or any step thereof, could be performed on, or provided by, any of the devices shown in FIGS. 1, 2 and 4-5 or the steps performed in FIGS. 7 and 9.

The process 800 begins at step 802, when the control circuitry (e.g., of device 508 and/or 510) identifies a user action associated with the user device while generating the first media asset. For example, the device determines that the user is walking while consuming the content (e.g., a soccer match between Juventus FC and Inter Milan). In another example, the user actions are determined from any one action provided in FIG. 6 or any other action that the user has provided information about. The device identifies the user actions using a sensor in the user device or any other linked or unlinked device (e.g., smartwatch, smart glasses, smartphone).

At step 804, the media device (e.g., via the control circuitry 404) searches in a lookup table or another database for one or more control actions that the consumer has previously provided while performing this action. For example, when the consumer walked and consumed content, the consumer provided a rewind command during the content's critical parts to re-watch the content. In another example, while listening to an audiobook and driving, the consumer provided a command to adjust the modulation and volume.

At step 806, the media device (e.g., via the control circuitry 404) automatically performs the control actions while the consumer is performing the identified user actions. For example, the media device will perform the previously stored command from the user in response to identifying the user's actions. When the user previously entered an action to adjust modulation while walking, the device provides modulation to the user in response identifying that the user is walking. The examples provided in FIG. 6 are not limiting: additional user actions and control commands may be performed.

Figure 9:
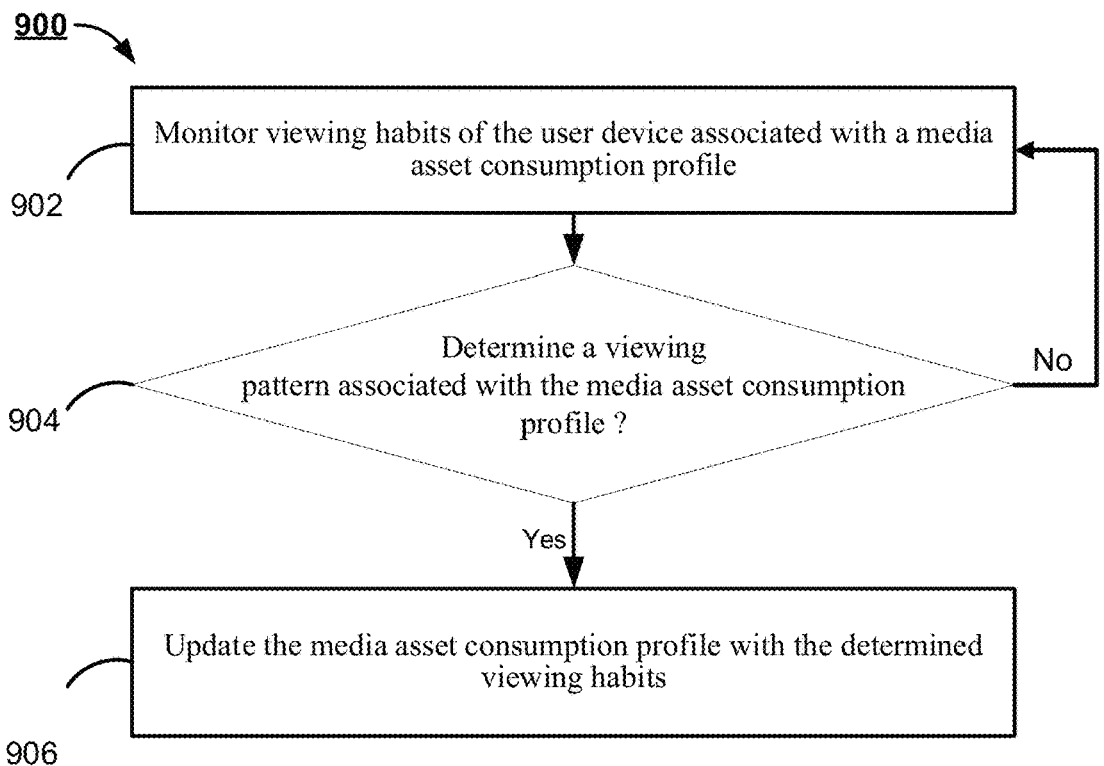
FIG. 9 is a flowchart of a detailed illustrative process for updating a media asset consumption profile based on viewing habits, in accordance with some embodiments of the disclosure.

FIG. 9 is a flowchart of a detailed illustrative process 900 for updating a media asset consumption profile based on viewing habits, in accordance with some examples of the disclosure. The process 900 may be executed by the control circuitry 404 of television, users device, set top box, a server or any other computing system (e.g., in a manner instructed to the control circuitry 404 by the media device). The control circuitry 404 may be part of user equipment (e.g., a device that may have any or all of the functionality of the user equipment devices 508 or 510) or of a remote server separated from the user equipment by way of the communication network 506, or distributed over a combination of both. It should be noted that process 900, or any step thereof, could be performed on, or provided by, any of the devices shown in FIGS. 1, 2 and 4-5 or the steps performed in FIGS. 7 and 8.

The process 900 begins at step 902, when the control circuitry (e.g., of device 508 and/or 510) monitors viewing habits of the user device associated with a media asset consumption profile. For example, the device monitors the consumer's commands of switching between multiple sources (e.g., channels) or using a second device to access other content related to the first media asset (e.g., soccer match). In some embodiments, the user device monitors the user actions using sensors embedded in the user device or any other linked or unlinked device (e.g., smartwatch, smart glasses, smartphone).

At step 904, the media device (e.g., via the control circuitry 404) determines a viewing pattern associated with the media asset consumption profile: for example, the consumer associated with the media asset consumption profile performs the same action or command when consuming a type of media asset. In some embodiments, the viewing pattern may be manually entered or identified through artificial intelligence of the device monitoring the consumer.

At step 906, the media device (e.g., via the control circuitry 404) updates the media asset consumption profile with the determined viewing habits. For example, in response to identifying the user's actions the media device will update the previously stored commands associated with the media asset consumption profile, to include the identified viewing habits.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "in response" should be understood to mean automatically, directly and immediately as a result of, without further input from the user, or automatically based on the corresponding action where intervening inputs or actions may occur.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
receiving a user interface request for a first media asset, wherein the first media asset comprises first video, first metadata, first subtitles and first audio;
determining a content category of the first media asset based on the first metadata associated with the first media asset, wherein the content category comprises a sport type or a genre;
identifying consumption habits associated with a user device for the content category determined;
identifying for the first media asset, based on the consumption habits associated with the user device for the content category determined, a content category profile associated with the user device, wherein the content category profile comprises a genre or sport type identified based on the consumption habits associated with the user device;
identifying one or more second media assets corresponding to the content category profile and the first media asset;
replacing one or more of the first subtitles and the first audio from the first media asset with one or more second subtitles and second audio from the second media asset; and
generating for output the first video from the first media asset with the replaced one or more second subtitles and second audio and the inserted interactive content from the second media asset,
wherein the content category profile comprises a user proficiency in a type of sport.

2. The method of claim 1, wherein the replacing one or more of the first subtitles and the first audio from the first media asset with one or more second subtitles and second audio from the second media asset comprises replacing the first audio of the first media asset with the second audio of the second media asset.

3. The method of claim 1, wherein identifying the content category profile comprises:
monitoring viewing habits of the user device associated with the content category profile;

determining, based on the monitored viewing habits, a viewing pattern associated with the content category profile; and updating the content category profile with the determined viewing pattern.

4. The method of claim 1, wherein the first media asset and the second media asset are the same video content with different audio and subtitle content.

5. The method of claim 1, wherein the second media asset comprises secondary content different than the first media asset, wherein the secondary content comprises one or more of games rules, game statistics, team statistics, player statistics, and fantasy statistics.

6. The method of claim 1, wherein the content category profile is selected from one of fun, beginner, intermediate, advance, comical and satirical profiles.

7. The method of claim 6, wherein the first media asset is live content.

8. The method of claim 1, further comprising identifying a user action associated with the user device while generating the first media asset, and wherein the replacing further comprises modifying the first media asset by one or more of modulation of the audio, repeating a portion of the first media asset identified as critical, adjusting a volume control, replacing the first subtitles from the first media asset with dynamic subtitles from the second media asset, replacing the first audio from the first media asset with dynamic audio content from the second media asset.

9. The method of claim 8, wherein the user action associated with the user device is one or more of walking, driving, focused watching, on the move, watching from a distance, watching on a mobile display while the generating for output the first video from the first media asset.

10. The method of claim 8, wherein the user action associated with the user device is identified automatically based on monitoring a movement of the user associated with the user device.

11. The method of claim 1, wherein the content category profile comprises a user preference for a sports team,
wherein the one or more second subtitles and second audio from the second media asset comprises information according to the user preference for the sports team.

12. The method of claim 1, wherein the user proficiency in the type of sport comprises a level of familiarity with the type of sport.

13. A system comprising:
a storage configured to store a content category profile;
input circuitry configured to receive a user interface request for a first media asset comprising first video, first metadata, first subtitles and first audio; and
control circuitry configured to:
determine a content category of the first media asset based on the first metadata associated with the first media asset, wherein the content category comprises a sport type or a genre;
identify consumption habits associated with a user device for the content category determined;
identify for the first media asset, based on the consumption habits associated with the user device for the content category determined, a content category profile associated with the user device, wherein the content category profile comprises a genre or sport type identified based on the consumption habits associated with the user device;
identify one or more second media assets corresponding to the content category profile and the first media asset;
replace one or more of the first subtitles and the first audio from the first media asset with one or more second subtitles and second audio from the second media asset; and
generate for output the first video from the first media asset with the replaced one or more second subtitles and second audio and the inserted interactive content from the second media asset,
wherein the content category profile comprises a user proficiency in a type of sport.

14. The system of claim 13, wherein, to replace the one or more of the first subtitles and the first audio from the first media asset with one or more second subtitles and second audio from the second media asset, the control circuitry is further configured to replace the first audio of the first media asset with the second audio of the second media asset.

15. The system of claim 13, wherein to identify the category profile the control circuitry is further configured to:
monitor viewing habits of the user device associated with the content category profile;
determine, based on the monitored viewing habits a viewing pattern associated with the content category profile; and
update the content category profile with the determined viewing pattern.

16. The system of claim 13, wherein the first media asset and the second media asset are the same video content with different audio and subtitle content.

17. The system of claim 13, wherein the second media asset comprises secondary content different than the first media asset, wherein the secondary content comprises one or more of games rules, game statistics, team statistics, player statistics, and fantasy statistics.

18. The system of claim 13, wherein the content category profile is selected from one of fun, beginner, intermediate, advance, comical and satirical profiles.

19. The system of claim 18, wherein the first media asset is live content.

20. The system of claim 13, wherein the control circuitry is further configured to identify a user action associated with the user device while generating the first media asset, and
wherein the replacing further comprises modifying the first media asset by one or more of modulation of the audio, repeating a portion of the first media asset identified as critical, adjusting a volume control, replacing the first subtitles from the first media asset with dynamic subtitles from the second media asset, replacing the first audio from the first media asset with dynamic audio content from the second media asset.

* * * * *